United States Patent [19]
Stottman et al.

[11] 4,333,521
[45] Jun. 8, 1982

[54] APPARATUS FOR THAWING FROZEN FOOD

[75] Inventors: Richard L. Stottman, Lima, Ohio; Peter H. Smith, Anchorage, Ky.

[73] Assignee: General Electric Company, Louisville, Ky.

[21] Appl. No.: 250,493

[22] Filed: Apr. 2, 1981

Related U.S. Application Data

[62] Division of Ser. No. 108,755, Dec. 31, 1979, Pat. No. 4,296,299.

[51] Int. Cl.³ .............................................. F25B 29/00
[52] U.S. Cl. ........................................ 165/63; 165/64; 62/80; 219/10.55 A; 219/10.81
[58] Field of Search ................... 62/80, 128, 151, 272; 219/10.47, 10.49 R, 10.53, 10.55 A, 10.55 F, 10.71, 10.81; 165/2, 58, 65, 63, 64, 12; 99/358; 219/383, 384, 520; 426/107, 112

[56] References Cited

U.S. PATENT DOCUMENTS

| | | | |
|---|---|---|---|
| 2,787,891 | 4/1957 | Hengehold | 62/80 |
| 2,859,945 | 11/1958 | Kleist | 165/63 X |
| 3,056,877 | 10/1962 | Schmidt et al. | 219/10.47 |
| 3,383,218 | 5/1968 | Jason et al. | 99/358 X |
| 3,394,007 | 7/1968 | Campbell | 219/10.81 X |
| 3,465,124 | 9/1969 | Sauer | 219/400 |
| 3,474,221 | 10/1969 | Jason | 99/358 X |
| 3,536,129 | 10/1970 | White | 165/2 |
| 3,608,627 | 9/1971 | Shevlin | 165/2 |
| 3,943,332 | 3/1976 | Marsh | 219/520 |
| 3,974,355 | 8/1976 | Bach | 219/10.81 |
| 3,976,122 | 8/1976 | Neidhardt | 165/64 X |
| 4,013,798 | 3/1977 | Goltsos | 426/107 |
| 4,027,132 | 5/1977 | Levinson | 219/10.55 F |

FOREIGN PATENT DOCUMENTS

| | | | |
|---|---|---|---|
| 532457 | 4/1957 | Belgium | 219/10.81 |
| 450062 | 7/1948 | Canada | 219/10.81 |
| 450144 | 7/1948 | Canada | 219/10.81 |
| 494407 | 7/1953 | Canada | 219/10.81 |
| 1123759 | 2/1962 | Fed. Rep. of Germany | 219/10.81 |
| 35-39250 | 2/1960 | Japan | 219/10.81 |

Primary Examiner—Volodymyr Y. Mayewsky
Attorney, Agent, or Firm—Frederick P. Weidner; Radford M. Reams

[57] ABSTRACT

Food thawing apparatus is disclosed specifically adapted for use in a refrigeration appliance. An enclosure having good thermal communication with surrounding environment is provided with a pair of planar electrodes defining a food thawing zone. One of the electrodes is movable to allow insertion of a frozen food load. A high frequency, relatively low wattage power supply provides uniform energy distribution throughout the feed load for gentle heating (thawing). Frequencies of 27.12 MHz or 43 MHz are suggested along with a power level of 100 watts or below, preferably 35-80 watts.

5 Claims, 9 Drawing Figures

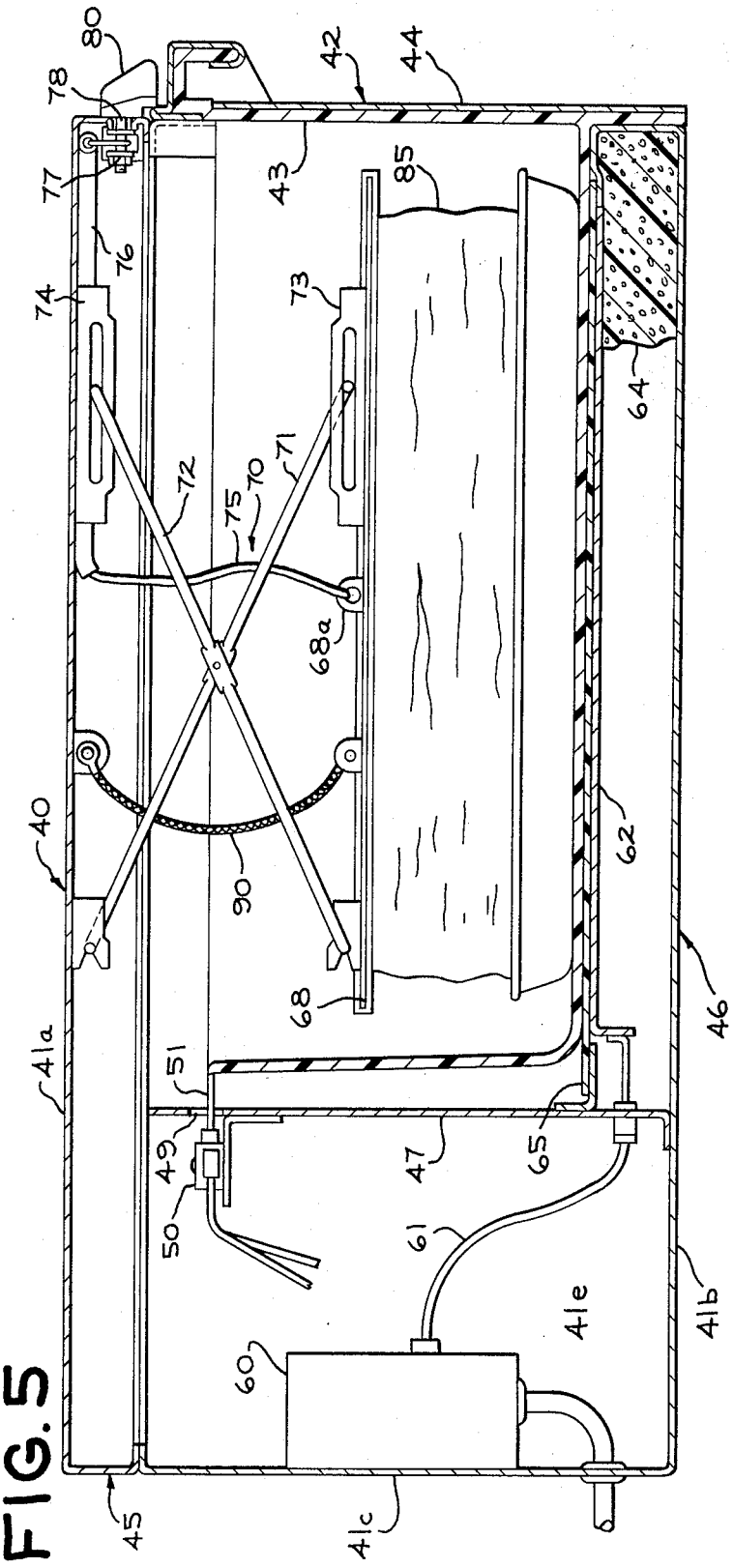
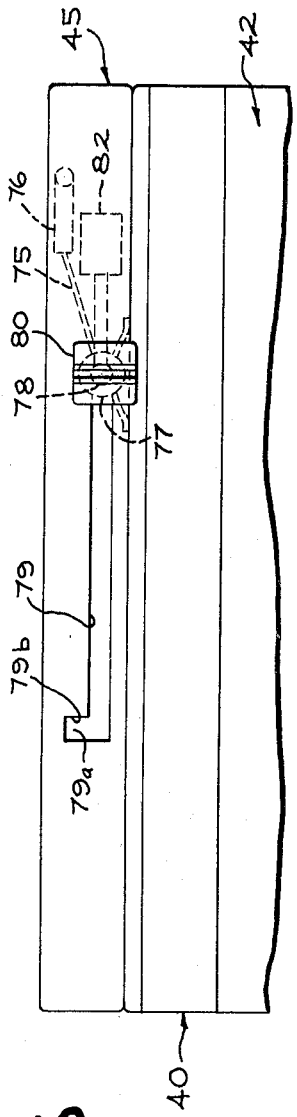
FIG.5
FIG.6

APPARATUS FOR THAWING FROZEN FOOD

CROSS REFERENCE TO RELATED CASE

This application is a Division of copending patent application Ser. No. 108,755, filed Dec. 31, 1979, now U.S. Pat. No. 4,296,299 for "Apparatus For Thawing Frozen Food" in the names of Richard L. Stottmann and Peter H. Smith and assigned to the assignee of this application.

BACKGROUND OF THE INVENTION

This invention relates to food thawing apparatus and, more particularly, to apparatus which is adapted for incorporation in a household refrigerator or freezer which operates to thaw frozen food using high-frequency electromagnetic energy.

The advantages of freezing food for preservation purposes are offset to some extent by the need to thaw the frozen food before it can be made ready for food preparation. In general, the need to thaw certain foods before cooking or making use of it in food preparation procedures is well known.

Typically, thawing of frozen food can be accomplished by allowing the food to stand at room temperature until it is fully thawed. In some cases, it is recommended that the frozen food be placed in the fresh food compartment of a refrigerator until thawed. Depending on the size of the food package, this procedure can be very time-consuming and when allowed to stand at room temperature, the timing must be such that the food is used promptly upon thawing or else immediately placed back into the refrigerator to avoid the possibility of food spoilage.

Microwave ovens are currently available that have provision for a low power setting intended to permit thawing of frozen food by means of electromagnetic radiation of energy into the food load. Although somewhat beneficial for this purpose, the microwave oven has certain drawbacks when used for defrosting frozen food. Typically, microwave ovens operate at extremely high frequency such as 915 MHz or, more commonly, 2450 MHz. As is well known, depth of penetration of the electromagnetic energy into a food load is proportional to the wavelength and at the frequency of 2450 MHz, at which most defrost operations are currently performed, the penetration at the low energy levels used for defrosting can be as shallow as one quarter inch. Thus heating initially occurs near the surface of the food load with internal heating (thawing) being a function of the degree of heat conduction through the food from the surface. Moreover, energy load-in at localized portions of the food, e.g. in the vicinity of a bone, can actually cause the food to become fully cooked at these locations while other portions of the food load are still frozen. Finally, as with room temperature thawing, it is necessary to insure that the thawed food is promptly cared for to avoid spoilage.

Commercial electromagnetic energy food thawing units are available that operate satisfactorily at lower frequencies, however, they are not practical for household use. They generally are found in high volume operations with employees in attendance to take the food and place it into a food preparation process immediately upon thawing.

There is, therefore, a need for a reliable, low cost food thawing apparatus suitable for household use. There is a need for such an apparatus that does not require constant attendance to avoid food spoilage and for an apparatus that uniformly thaws the food load without excessive heating or even cooking of localized portions of the food load before complete thawing is achieved.

SUMMARY OF THE INVENTION

In accordance with the principles of the invention, there is provided for use in a refrigeration appliance an apparatus for thawing a frozen food load comprised of a food thawing enclosure adapted to be positioned within and in good thermal communication with the low temperature atmosphere of the refrigeration appliance. Included within the enclosure are first and second electrodes defining a food thawing zone therebetween. Means are provided for moving at least one of the electrodes to permit removable placement of the food load in the thawing zone with both electrodes in close physical proximity to the food load during the thawing process. The apparatus of the invention further includes means for supplying high frequency electromagnetic energy to the electrodes for gentle heating of the food load whereby the food load can be thawed and subsequently maintained at the food preservation temperature of the refrigeration appliance. Preferably, the frequency of the electromagnetic energy is below about 100 megahertz, for example at 27.12 MHz or 43 MHz. A radio frequency power supply of under 100 watts is considered satisfactory with a range of between about 35-80 watts being preferred for most applications in a household refrigerator.

BRIEF DESCRIPTION OF THE DRAWINGS

FIGS. 5-8 are views of food thawing apparatus representing the presently preferred embodiment of the invention and illustrating structural details thereof.

DESCRIPTION OF PREFERRED EMBODIMENT

Figure 1:
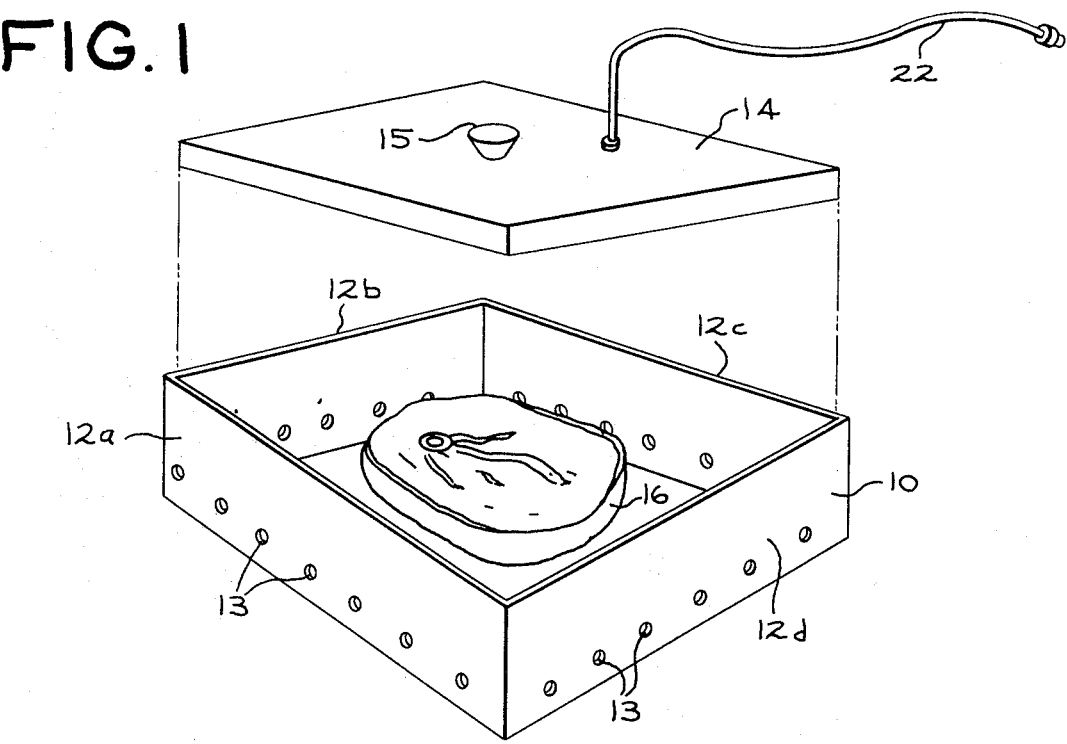
FIG. 1 is a schematic representation in perspective of an exemplary embodiment of the present invention.
Figure 2:
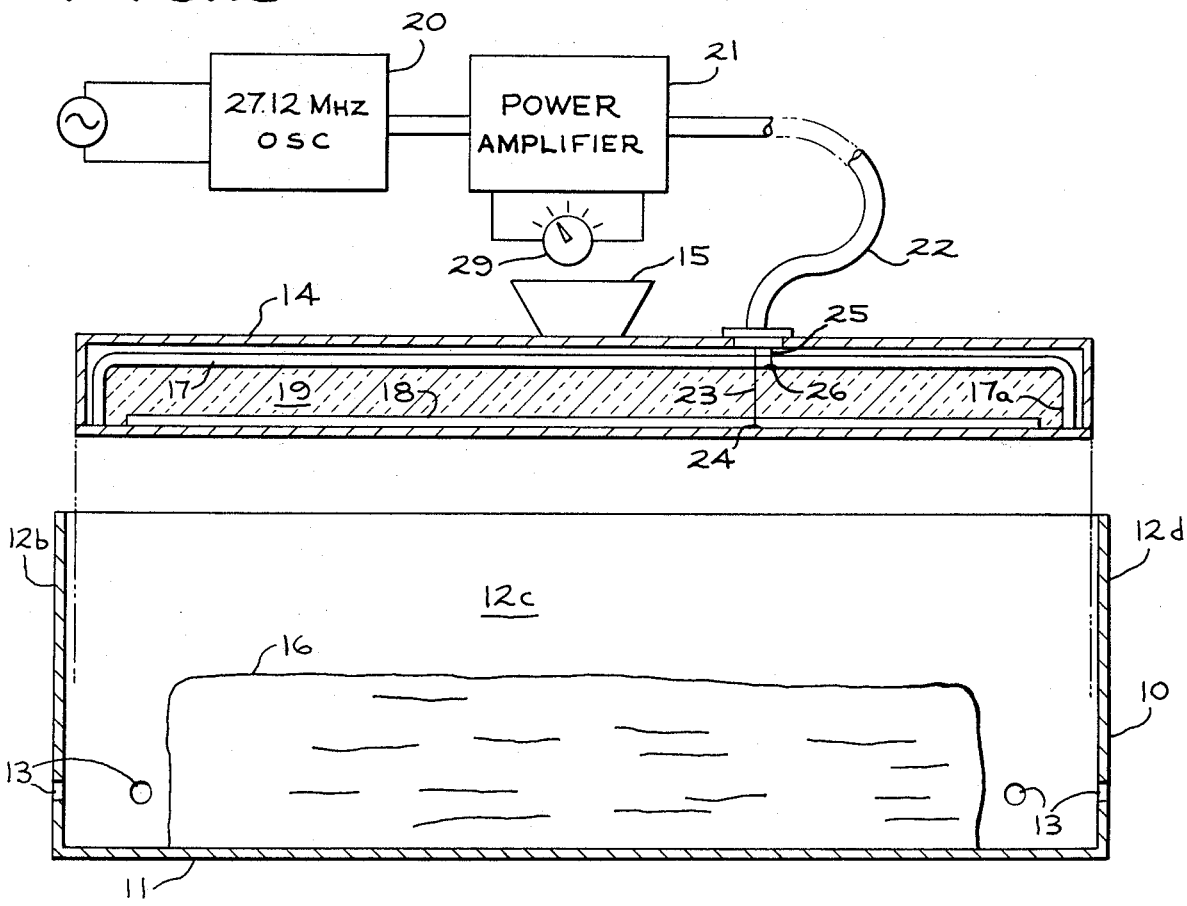
FIG. 2 is a side view schematic representation of the embodiment of FIG. 1.

Referring first to FIGS. 1 and 2, for purposes of disclosure, one preferred embodiment of food thawing apparatus for a refrigeration appliance is shown in schematic form and comprises an enclosure which includes a pan-shaped portion 10 having a bottom 11, and side walls 12a-d sized so as to be suitable for placement in a refrigeration appliance, such as a household refrigerator or freezer. In this embodiment, the pan 10 is preferably made of a material that has good thermal and electrical conductivity characteristics and is also safe for contact with foods. Stainless steel is an example of a material that would serve this purpose. Good thermal communication with the low temperature environment of the refrigerator compartment may be enhanced by the inclusion of perforations 13 in one or more of the sides of pan 10. A top cover 14 is provided on which is mounted a handle 15 to make the cover removable for providing access to the interior of pan 10 thus enabling insertion and removal of a frozen food load 16. Cover 14 comprises an outer structure of direct current electrically insulative material of any suitable well known composition and is formed into a generally hollow configuration. The interior of cover 14 has mounted therein an electrically conductive metal sheet or plate 17 in the form of an inverted pan with downwardly extending walls 17a extending around the inner perimeter of cover 14. Another electrically conductive plate or electrode 18 is positioned atop the undersurface of cover 14 and defines a first electrode for the food thawing apparatus of the invention. Electrode 18 is separated from electrically conductive plate 17 preferably by means of a direct current electrical insulating material 19 of any suitable well known composition such as expanded bead polystyrene. The size and shape of cover 14, in relation to pan 10, is such as to permit cover 14 to be inserted horizontally into the pan 10 with a close fit between the perimeter of cover 14 and the inner surfaces of the pan 10. Preferably, the cover 14 is moved down until it engages and rests on food load 16. Pan 10 comprises a second electrode and the volume between electrode 18 and the bottom of the pan then defines a food thawing zone.

Figure 3:
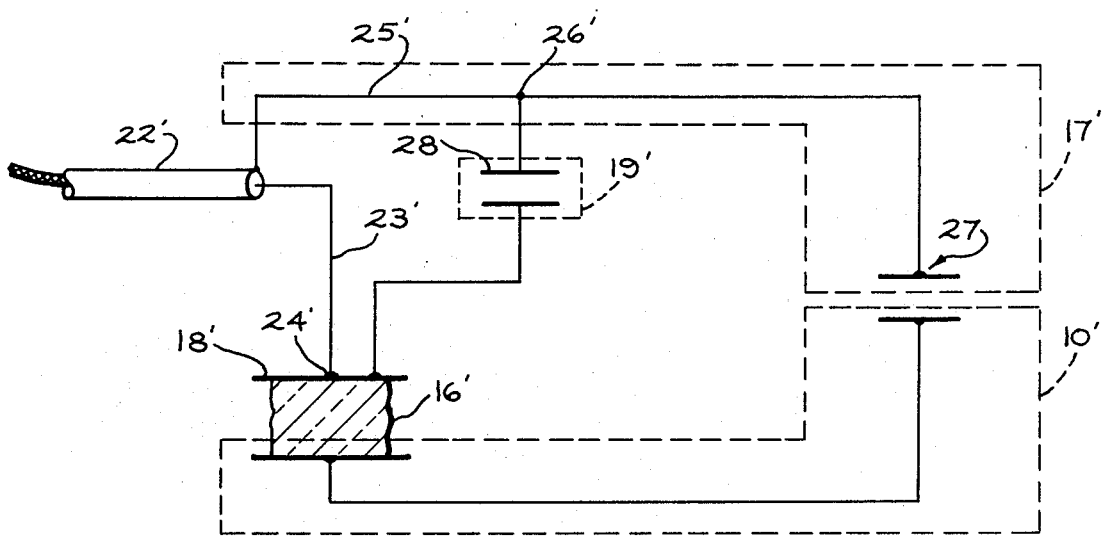
FIG. 3 is a simplified schematic of an equivalent circuit diagram useful in explaining the operation of the invention as structurally shown, for example, in FIGS. 1, 2 and 4.
Figure 7:
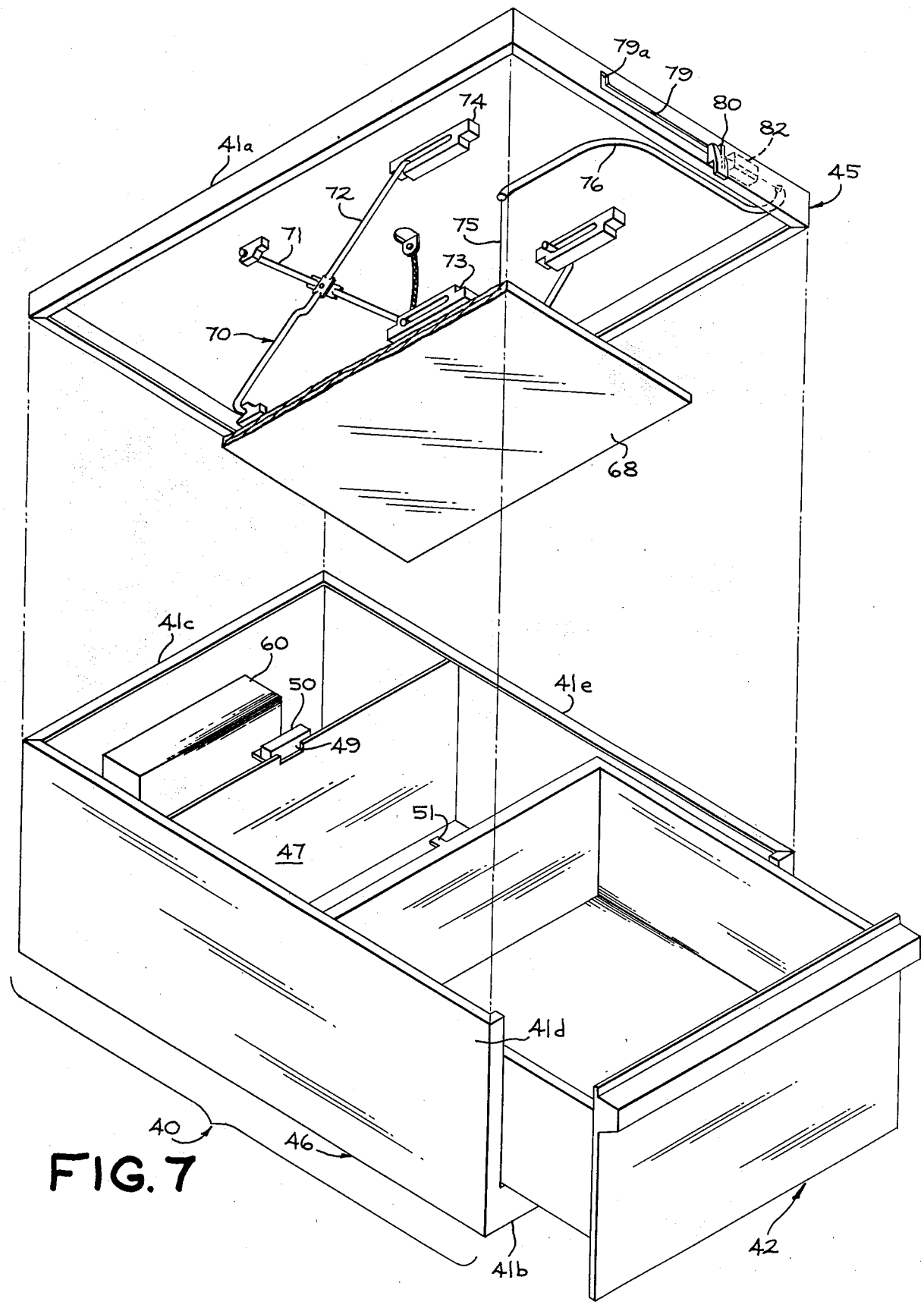
Figure 8:
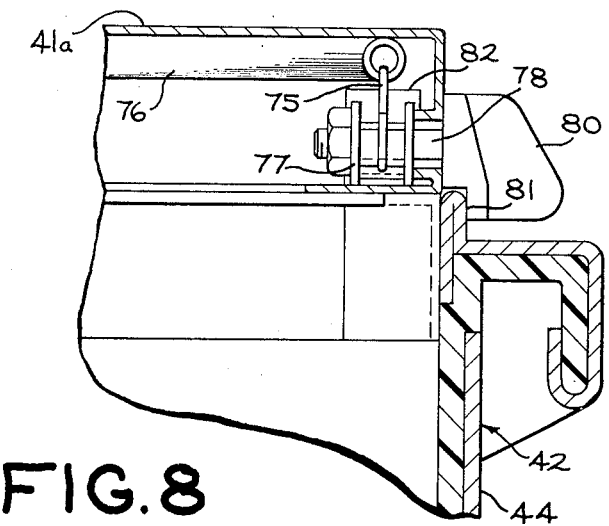
Figure 9:
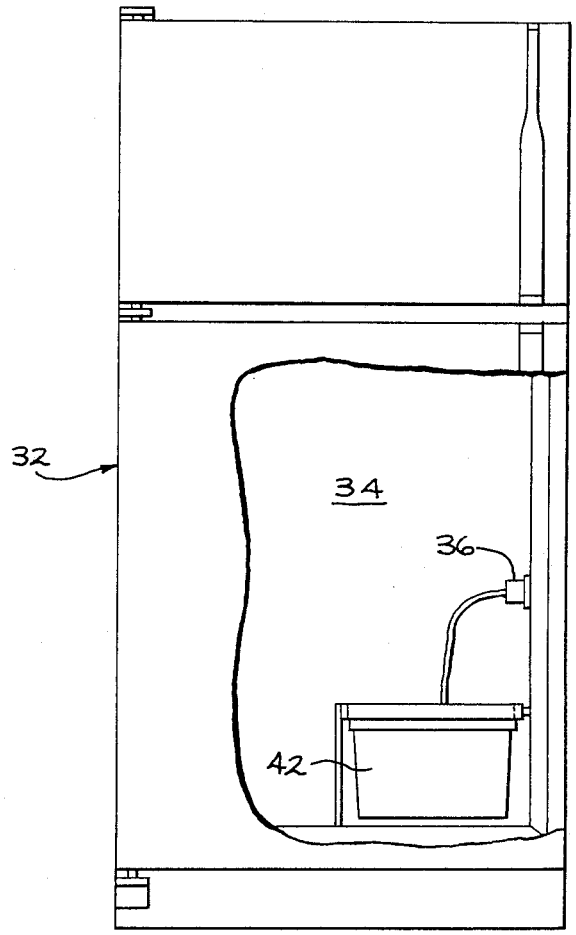
FIG. 9 shows an exemplary embodiment of the present invention in a refrigerator appliance.

The apparatus of the invention further includes means for supplying high frequency electromagnetic energy between electrodes 18 and pan 10 to excite within the food load 16 a low intensity heating effect which serves to thaw or defrost the food from the frozen condition. To this end, the output of a 27.12 MHz oscillator 10 is amplified in a power amplifier 21 and coupled via a coaxial cable 22 to the cover 14. These electronic components, therefore, with this arrangement may be located in a remote compartment of the refrigeration appliance. The "hot" or center conductor 23 is electrically connected to the planar electrode 18 at terminal 24 while the grounded outer conductor 25 is electrically connected to the conductive metal plate 17 at terminal 26. Due to the close fit between the perimeter of cover 14 and the inner surface of pan 10, when the cover 14 is lowered into the pan 10 and surrounded by walls 12a-d, a capacitive coupling indicated as 27 in FIG. 3 is provided from the pan electrode to the metal plate 17, thus providing a complete high frequency circuit from power amplifier 21 to the two food thawing electrodes 18 and pan 10. A timer control 29 is also provided to control the amount of time for operation of the thawing process. For example, a 120 minute timer may be provided with actual dial markings given in terms of weight. For a given level of high frequency power, temperature rise in a food load is directly proportional to weight. This is a matter of convenience to the user since thawing can be more readily expressed to the user in terms of food weight than in exposure time.

In operation, therefore, the food weight is initially determined and the frozen food placed in the pan. The cover 14 is inserted into the pan until it rests on the food load and the timer 29 is set to the proper dial setting which then initiates the thawing process. The food load between the electrodes serves as a lossy dielectric thus absorbing the major portion of the applied energy. In FIG. 3, a simplified schematic of the equivalent electrical circuit for the food thawing apparatus as structurally shown in FIGS. 1, 2 and 4 and the prime numbers correspond to the same numbered elements in FIGS. 1, 2 and 4 as shown. Thus the food load 16' serves as a lossy dielectric between the electrodes 18' and 10', the return circuit being completed due to the capacitive coupling 27 from the pan 10' electrode to the conductor 17'. The capacitor 28 represents the shunt path through the insulator 19' in the cover cavity from electrode 18' to conductor 17', however, by suitable choice of dielectric material, the effect of this shunt path is made somewhat negligible as compared to the losses incurred in the food load 16'. Keeping in mind that the apparatus is adapted to be located within the refrigeration appliance, at the conclusion of the thawing process, the thawed food can be allowed to remain in the enclosure without concern for food spoilage due to the low temperature in the pan 10 caused by the good thermal communication provided with the low temperature environment of the refrigeration appliance by the structure of the enclosure pan.

The power output of amplifier 21 is preferably at a relatively low level such as 100 watts or below, and most preferably an output power level of between about 35 to 80 watts is employed. The use of such low power requires a longer thawing cycle than if higher levels were to be used, but has the advantages of low implementation cost, low levels of electromagnetic radiation and, most particularly, has been found to provide an improved thermal profile across the frozen food load as it is being thawed. Additionally, because the power output employed is low, the electronic power generating components may be remotely located with power being connected by the relatively inexpensive coaxial cable 22.

Figure 4:
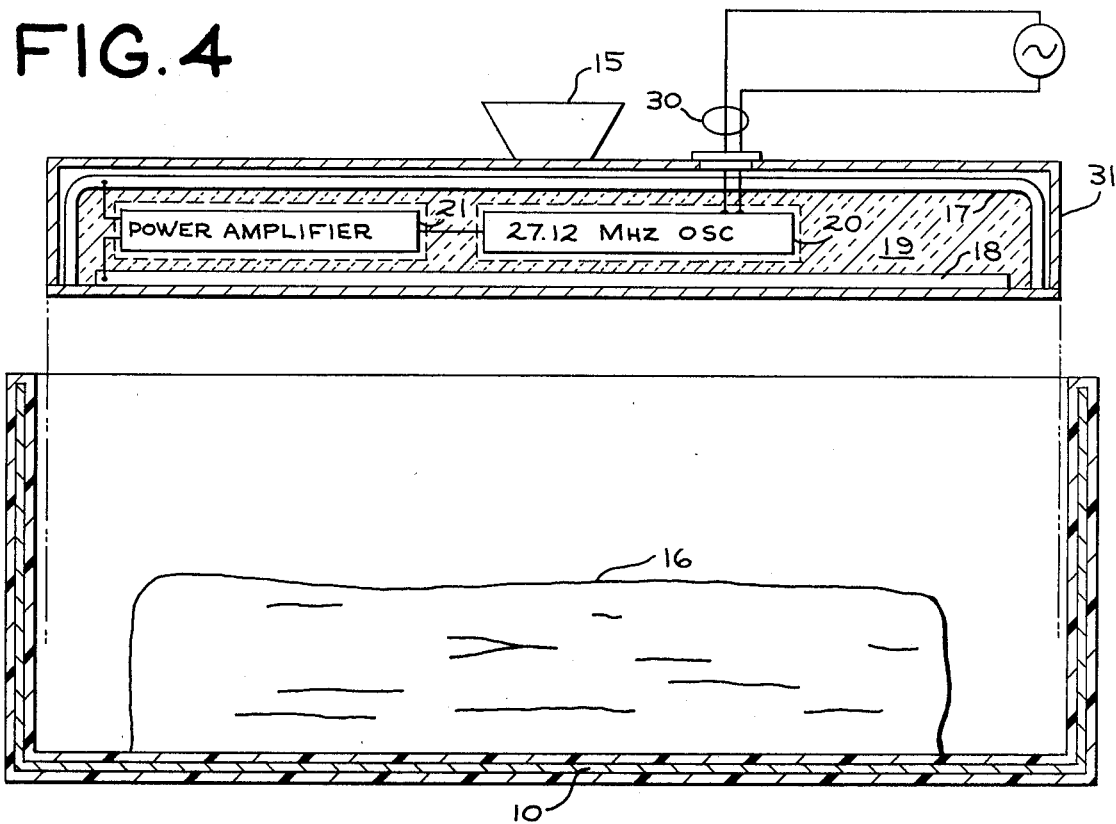
FIG. 4 is a side view schematic representation of an alternative embodiment of the invention.

Referring now to FIG. 4, an alternative embodiment of the food thawing apparatus is shown in which components that are similar to the embodiment of FIGS. 1 and 2 bears the same reference numerals. In this embodiment, two changes are made. First, the power supply components encased in shielded compartments 20a and 21a, respectively, which are made of electrically conductive material, are mounted within the internal cavity of top 14, nested within the insulator material 19. This permits the use of a simple two conductor electrical cord 30 which is somewhat more flexible than the coaxial cable 22 of FIG. 1. It will be understood that the internal cavity of top 14 housing the oscillator 20 and power amplifier 21 components is of a zero dielectric loss factor so no heating of this cavity or the components contained therein takes place. Also, pan 10 is coated with a low loss plastic material which is suitable for contact with food and use in a dishwasher. Although such an arrangement still permits the use of perforated sides for the enclosure, it may be less convenient to do so and, therefore, it may be preferable to include vent slots 31 in the perimeter of cover 14 to avoid the build-up and trapping of steam or vaporized moisture in the enclosure.

Referring now jointly to FIGS. 3-8, there will be described what, at present, is considered to be the preferred embodiment of the invention especially adapted for use in a household refrigerator in a space that might normally be devoted to provision of a vegetable or meat storage drawer. In fact, with the food thawing apparatus of FIGS. 5-8, the advantage of a meat or vegetable storage drawer is not lost since, when not being used for thawing, this embodiment advantageously serves as such a storage drawer.

Thus, the food thawing apparatus of FIGS. 5-8 comprises an enclosure 40 formed by a top 41a, bottom 41b, back 41c and left and right sides 41d, 41e comprised of a metallic shield material. The compartment 40 may be made entirely of conductive metal or, alternatively, of a plastic composition with metal shield material adhered to the surface thereof or embedded within the plastic. The enclosure 40 is open in the front to recieve a drawer 42 which is made of plastic and which has its front face formed with a metallic shield material 44. The main body of enclosure 40, as shown in the drawings, is comprised of two separate sections, an upper section 45 and a lower section 46, mainly for ease in manufacture. The lower section 46 is divided into two compartments by a divider wall 47 having an opening 49 therein behind which is positioned a safety interlock microswitch 50. A mating tongue 51 on the rear wall of drawer 42 preferably extends through opening 49 to engage the plunger of microswitch 50 only when the drawer 42 is inserted fully into its forward compartment in enclosure 40. As will be seen, microswitch 50 serves as a safety interlock to prevent operation of the food thawing apparatus unless the drawer 42 is properly seated, thus assuring that enclosure 40 is fully enclosed with a metallic radiation shield.

A power supply 60 is provided in the rear compartment of enclosure 40 for supplying high frequency electromagnetic energy. The high frequency output of power supply 60 is coupled via cable 61 to a first planar electrode 62 located underneath the bottom wall of drawer 42. Preferably the size of electrode 62 is such as to be generally coextensive with at least a substantial portion of the area of the drawer 42 bottom wall. Electrode 62 rests on a supporting insulator material 64 which fills the bottom space of the forward compartment beneath drawer 42. Electrode 62 is separated from drawer 42 by means of a shelf 65 formed by any suitable low loss dielectric material, such as a glass-ceramic material.

The upper section 45 of enclosure 40 is provided with means for movably supporting a second planar electrode 68 in generally parallel relationship to the first electrode 62. More specifically, electrode 68, which preferably is of about the same size and shape as electrode 62, is attached by means of a scissors jack mechanism 70 to the horizontal top wall 41a of enclosure 40. Electrode 68 may, for hygenic reasons, be enclosed within a removable thin plastic coating but an electrical ground connection is provided by a braided conductor 90 to the metallic shield of enclosure 40. The metallic shield in turn is connected to a common ground connection of power supply 60 to provide a return path for the high frequency circuit employed in the food thawing process in accordance with the teachings of the disclosure in FIGS. 1-3. The scissors jack mechanism 70 is comprised of a duplicate pair of hingedly connected arms 71, 72 connected from both sides of electrode 68 to the upper wall 41a of enclosure 40. One end of arm 71 is pivotally attached to top wall 41a and a corresponding end of arm 72 is pivotally attached to electrode 68. Arms 71, 72 are pivotally attached to each other at their centers while the other ends thereof slidably engage slotted mounts 73 and 74 respectively mounted on electrode 68 and top 41a.

Means for raising and lowering electrode 68 includes flexible pull cord 75 secured to electrode 68 at eyelet 68a and extending through a tubular guide conduit 76 to hub 77 mounted on a shaft attached to drawer latch knob 80. The shaft 78 extends through a horizontal slot 79 formed at the front downwardly depending skirt of top section 45. The left end of slot 79 includes an upwardly extending section 79a which permits latch knob 80 to be raised. Latch knob 80 is provided with a downwardly depending lip (FIG. 8) which, when latch knob 80 is in the horizontal section of slot 79, rides over and engages the upper edge of drawer 42 thus locking the drawer in place. When latch knob 80 is moved to the left and raised into slot section 79a, lip 81 disengages the upper edge of drawer 42 thus permitting the drawer to be removed.

As previously noted, flexible pull cord 75 is attached at one end to electrode 68 and at the other end to hub 77 on latch knob 80. The length of cord 75 is chosen to enable the electrode to be lowered by the force of gravity when latch knob 80 is moved to the right such that electrode 68 reaches or nearly reaches the bottom of drawer 42 when latch knob 80 is at the extreme right end of slot 79. In this position, hub 77 is arranged to depress the plunger of a microswitch 82, the latter serving simultaneously as an additional safety interlock and start switch for the high frequency power supply circuit. When latch knob 80 is moved to the left, the electrode 68 is raised by the force exerted through pull cord 75 until latch knob 80 reaches the extreme left of slot 79 at which time electrode 68 is nested in the upper section 45 of enclosure 40. In this position, electrode 68 is above drawer 42 thus permitting removal of the drawer. Electrode 68 is held in the upper position by moving latch knob 80 up into slot section 79A, the force of gravity holding knob 80 against the vertical edge 79b. An indention might also be provided at this point to help in holding latch knob 80 in the raised position.

Assuming a frozen food load 85 is placed in drawer 42 and inserted into enclosure 40, when latch knob 80 is lowered, to lock drawer 42 in place, and then moved to the right to lower electrode 68, the electrode 68 will descend until it engages the upper surface of the frozen food load 85. However, latch knob 80 must still be moved to the extreme right to engage the interlock switch 81. Because electrode 68 is free riding on scissors jack mechanism 70, it remains without undue pressure on the top of food load 85. Also by virtue of the action of the scissors jack mechanism 70, electrode 68 remains horizontal despite any uneven surface of the food load 85 that it might engage. In this way, maximum energy with even distribution is coupled into a given food load configuration thus providing even heating (thawing) of the food load.

It will be appreciated that the interlock switch connections have not been shown for simplicity reasons. Moreover, a timer control (not shown) may also be provided as previously described in connection with the disclosure of FIG. 2.

Several advantages of the embodiment of FIGS. 5-8 will be readily apparent from the foregoing description. By building the food thawing apparatus into the refrigeration appliance, frozen food may be thawed and allowed to remain in the drawer without fear of food spoilage, a very valuable convenience in working households. The configuration is such that the drawer may be used as a vegetable or meat storage compartment when not being used for thawing, thus not wasting drawer space in a refrigerator. The design is simple and low cost and has the advantage of safety since the thawing process cannot very easily be activated when the drawer is removed from the compartment. Moreover, since the mechanical and electrical components are self-contained in the built-in portion of the apparatus, the drawer may be conveniently removed for cleaning without concern for any harm to the mechanical or electrical components of the apparatus.

While in accordance with the patent statutes, there have been described what are at present believed to be the preferred embodiments of the invention, it will be apparent to those skilled in the art that various changes and modifications may be made therein without departing from the invention. It is intended, therefore, by the appended claims to cover all such changes and modifications as fall within the true spirit and scope of the invention.

What is claimed is:

1. A refrigerator comprising:
   a food storage compartment;
   means for maintaining the food storage compartment at a relatively cool temperature for food preservation purposes;
   a food thawing enclosure including top, bottom and side walls comprised of electromagnetic radiation shielding material within said food storage compartment and being in good thermal communication with the food storage compartment, said enclosure having a pair of electrodes therein defining a food thawing zone;
   means providing access to said enclosure for enabling removable insertion of frozen food into said food thawing zone;
   and means for supplying high frequency electromagnetic energy to said electrodes;
   whereby the frozen food may be thawed and allowed to remain in said enclosure subsequent to thawing, the temperature within said enclosure being substantially at the temperature of the food storage compartment thus preventing spoilage of the thawed food.

2. The refrigerator of claim 1 wherein the shielding material comprises one of the electrodes.

3. The refrigerator of claim 1 wherein the means providing access to said enclosure for enabling removable insertion of frozen food into said food thawing zone comprises a removable top cover closely fitting within said side walls and in which one of said electrodes is disposed within said top cover.

4. The refrigerator of claim 1 wherein the enclosure side walls are perforated to maintain good thermal communication with the relatively cool temperature of the food storage compartment.

5. The refrigerator of claim 3 wherein the periphery of the top cover fits closely with the said walls of the enclosure to allow vaporized moisture to escape from the enclosure during the thawing process.

* * * * *